United States Patent [19]

Swersey et al.

[11] 4,281,730
[45] Aug. 4, 1981

[54] SCALE

[76] Inventors: Burt L. Swersey, 152 Edgemont Rd.; Peter Fried, 17 Hearthstone Cir., both of Scarsdale, N.Y. 10583

[21] Appl. No.: 112,224

[22] Filed: Jan. 15, 1980

[51] Int. Cl.³ .............................................. G01G 19/52
[52] U.S. Cl. .................................... 177/144; 177/145; 177/256
[58] Field of Search ............... 177/144, 145, 256, 257, 177/DIG. 9, DIG. 3, 210 EM

[56] References Cited

U.S. PATENT DOCUMENTS

| | | | |
|---|---|---|---|
| 3,658,143 | 4/1972 | Schwartz | 177/257 X |
| 3,961,675 | 6/1976 | Siegel | 177/145 X |
| 4,023,633 | 5/1977 | Swersey | 177/144 |

Primary Examiner—Joseph W. Hartary
Attorney, Agent, or Firm—Kenyon & Kenyon

[57] ABSTRACT

An under bed scale which is comprised of a support frame, a load frame mounted on the support frame for receiving a load and for moving vertically relative to the support frame upon receiving the load, a pair of beam arms connected to the load frame to pivot about a respective horizontal axis in response to movement of the load frame, springs mounted on the support frame and secured to each beam arm to proportionally restrain movement of the beam arm relative to the support frame and a pair of means mounted on the support frame for emitting a signal corresponding to the displacement of each respective beam arm relative to the support frame.

13 Claims, 9 Drawing Figures

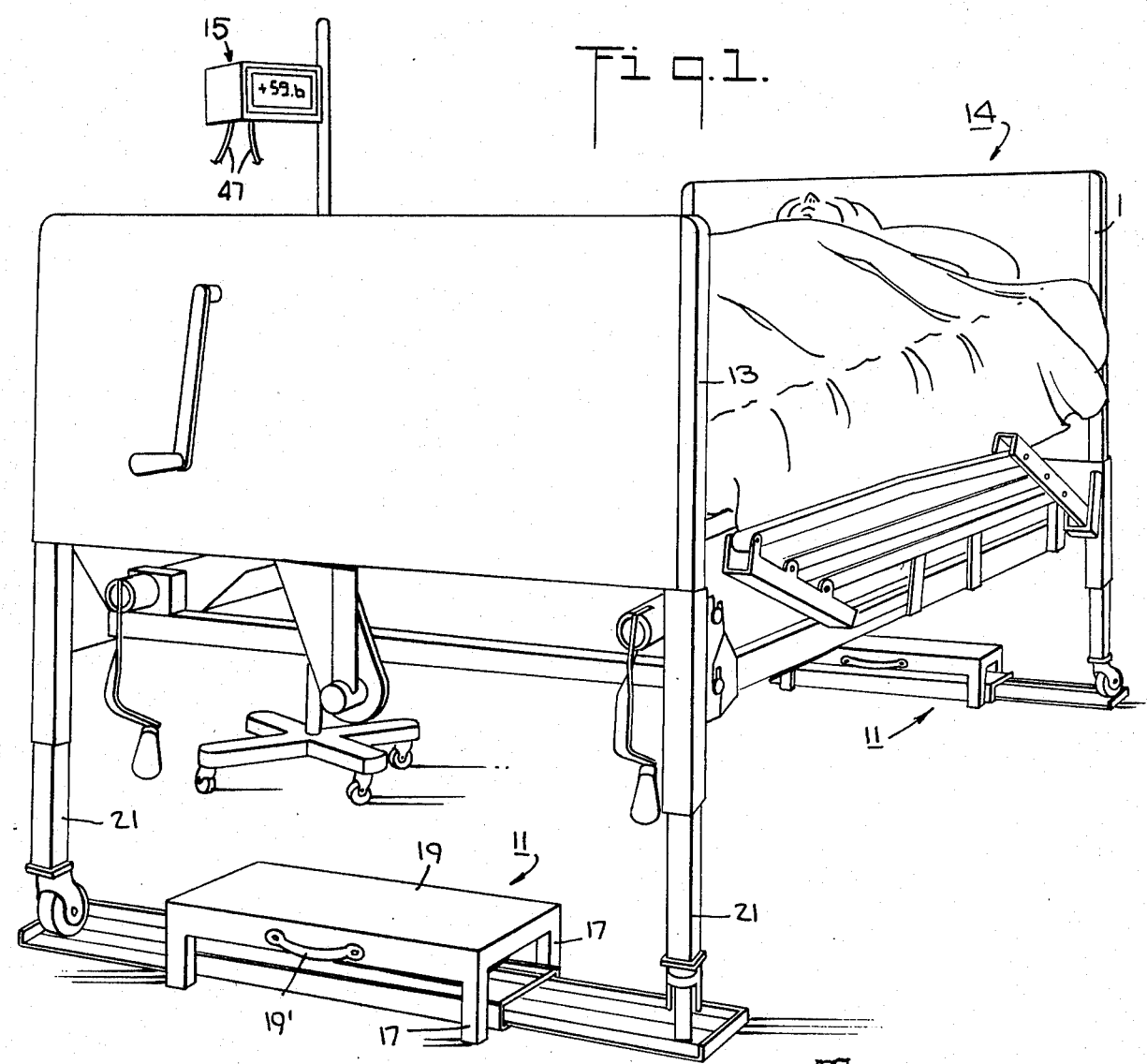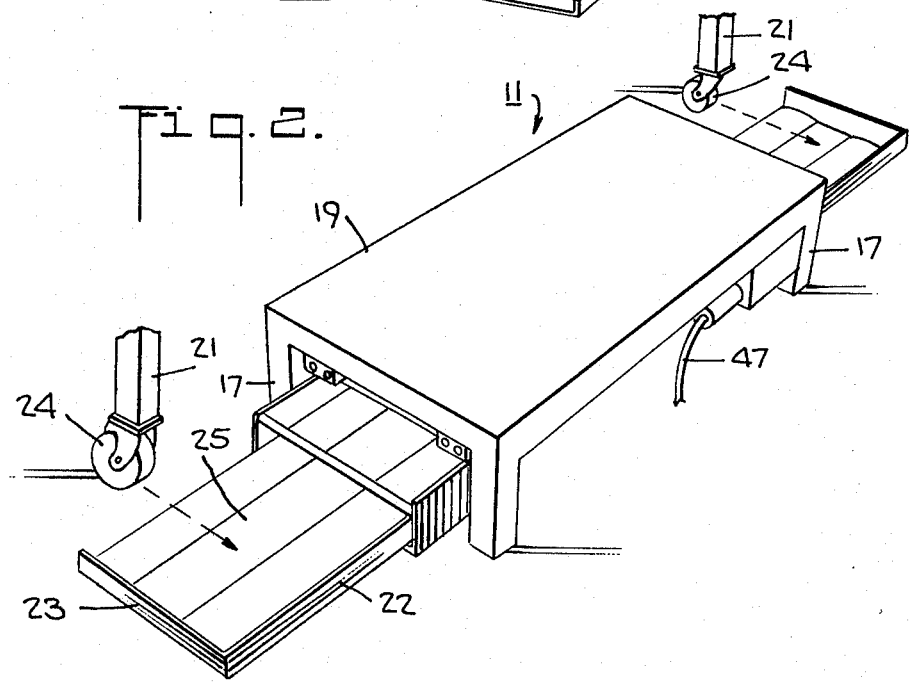

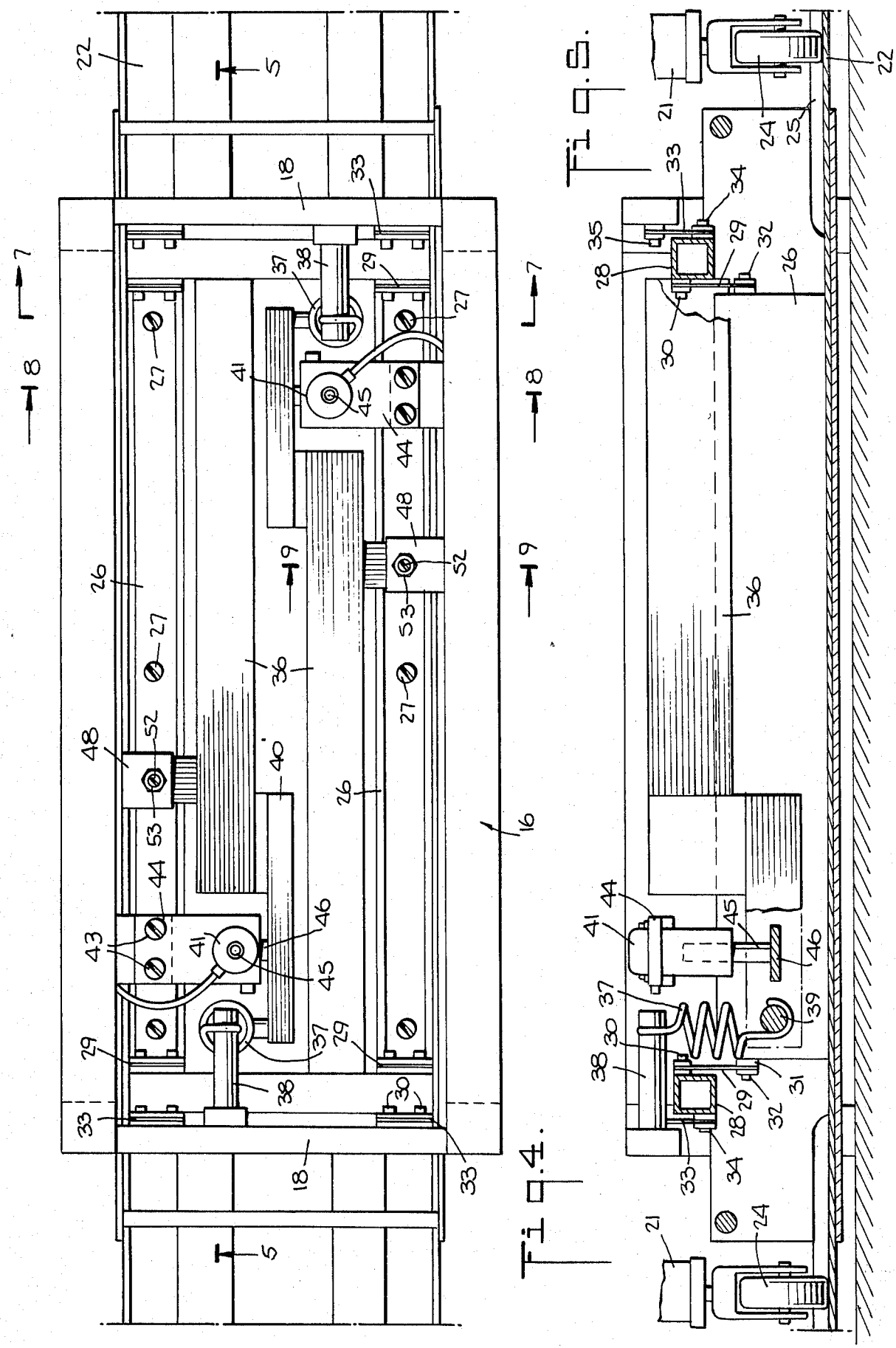

SCALE

This invention relates to a scale. More particularly, this invention relates to an under bed scale.

As is known, various types of scales have been used for weighing purposes. In some of the more conventional types, a load platform is used to receive a load and various mechanical, hydraulic and/or electrical means are used to transmit a signal corresponding to the mass of the load to a readout or dial device to display a measure of the weight of the load. In many cases, use has been made of knife edges and levers in order to transmit the load from the load platform to the readout devices. However, because such scales incur wear, these scales become inaccurate over periods of time. In order to overcome such deficiencies, various types of flexure scales have been proposed.

Generally, flexure scales have utilized flexible resilient metallic bands as suspending, connecting and fulcra elements for sustaining the entire load. Such scales are described in U.S. Pat. Nos. 1,790,509 and 2,736,539. Other types of flexure scales have utilized load cells which are mounted symmetrically within the scale frame in order to receive a load from a load platform and to transmit a signal in response thereto, for example as described in U.S. Pat. No. 3,658,143. Still other types of flexure scales are known which employ strain gauge transducers, such as described in U.S. Pat. Nos. 3,512,595 and 3,666,032 to weigh loads.

However, many of the known flexure scales have been relatively expensive. For example, in comparison with ordinary platform scales, the cost of electronic readout flexure scales is about twice as much. In addition, the use of strain gauges adds to the cost of such scales since the strain gauges themselves are relatively expensive and require rather complex and expensive electronic circuitry to obtain a readout of weight.

A flexure scale has also been known from our previous U.S. Pat. No. 4,023,633 which incorporates a load frame within a support frame via a flexure arrangement whereby a load on the load frame can be read out on an electronic readout means. As described, this flexure scale has a load frame and a pair of displacement transmitting members, each of which carries a beam arm with one beam arm connected to another. Also, a simple spring is connected to one of the beam arms to proportionately restrain movement of both beam arms. However, in order to adjust this scale in the field, a time-consuming leveling must take place using shims to adjust the two beam arms if the scale is placed on an uneven surface. Flexure scales of this type can also be built into a hospital bed so as to obtain the weight as well as fluctuations in weight of a bed-ridden patient. Such a construction is, however, expensive and cannot be readily removed from the bed for use elsewhere.

Accordingly, it is an object of the invention to provide a scale which can be moved from place to place to obtain measurements of weight of bed-ridden patients.

It is another object of the invention to provide for an easy adjustment of a flexure scale on non-level surfaces.

It is another object of the invention to increase the accuracy of flexure scales.

It is another object of the invention to provide a scale which can be easily utilized by hospitals for obtaining weights of bed-ridden patients.

It is another object of the invention to provide a scale which can be easily transported from place to place.

It is another object of the invention to provide a bed scale for medical use which is relatively inexpensive and reliable.

Briefly, the invention provides a scale which is comprised of a support frame, a load frame mounted on the support frame for receiving a load and for moving vertically relative to the support frame upon receiving the load, a pair of beam arms connected to the load frame to pivot about a respective horizontal axis in response to movement of the load frame, springs mounted on the support frame and secured to each beam arm to proportionally restrain movement of the beam arm relative to the support frame and a pair of means mounted on the support frame for emitting a signal corresponding to the displacement of each respective beam arm relative to the support frame.

In addition, a single readout, e.g. in the form of a digital readout is provided for receiving a signal from each means and for displaying a value corresponding to the received signals as a measure of weight of a load on the load frame.

The load frame is constructed with a loading ramp which extends longitudinally of and within the support frame in order to receive a load thereon. In addition, the load frame includes a pair of parallel beams which are fixed to the ramp within the support frame. These beams are connected via load flexures at the respective ends to a displacement transmitting member, which, in turn, is connected via support flexures to the support frame. The mounting arrangement is such that as the load frame moves vertically, the displacement transmitting members pivot on the support flexures.

Each displacement transmitting member is secured to a respective beam arm so that the beam arm pivots with the displacement transmitting member. In this way, when a load is placed on the loading ramp, the vertical displacement of the load frame causes pivoting of the beam arms and, thus, the emission of a signal corresponding to the weight of the load on the ramp.

It has been found that by restraining each beam arm with an individual calibrated spring, the accuracy of the scale is improved. In this regard, the amount of deflection each spring undergoes when a load is applied is half that of a single spring for both beam arms of a scale. Thus, the sensitivity of the springs remains of a high order. Further, the hysteresis of each spring is lessened since there is less elongation.

The scale can be readily used in pairs to weigh loads such as patent-containing beds in hospitals. In these cases, the scales are connected to a single readout such that the signals emitted from each beam arm are summed and a single reading obtained.

These and other objects and advantages of the invention will become more apparent from the following detailed description and appended claims taken in conjunction with the accompanying drawings in which:

FIG. 1 illustrates a perspective view of an under bed scale according to the invention having a bed mounted thereon for weighing purposes;

FIG. 2 illustrates a platform of the under bed scale of FIG. 1;

FIG. 3 illustrates a perspective view of the under bed scale of FIG. 1;

FIG. 4 illustrates a top view of the under bed scale of FIG. 1;

FIG. 5 illustrates a view taken on line 5—5 of FIG. 4;

Figure 6:
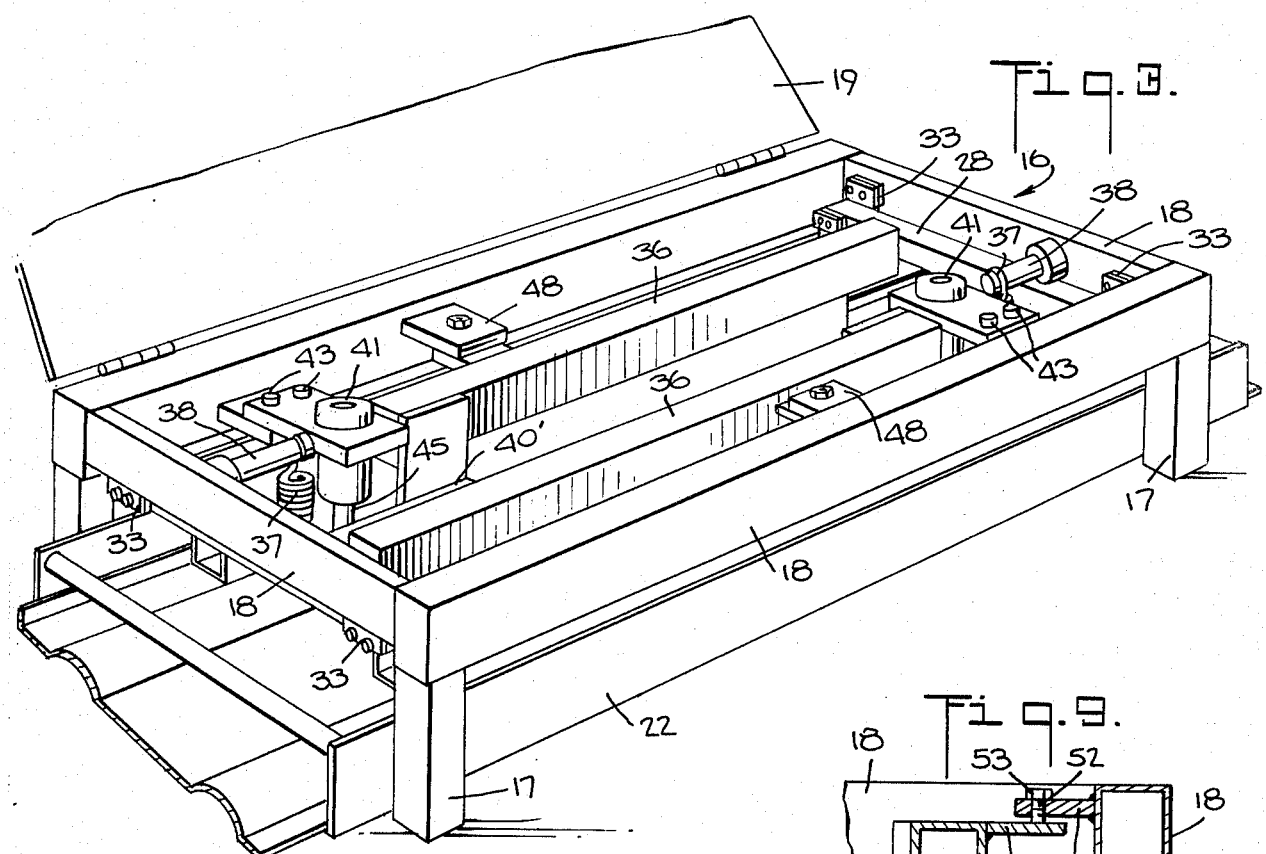
FIG. 6 illustrates an exploded view of a platform of an under bed scale according to the invention.

Referring to FIG. 1, the under bed scale is comprised of a pair of platforms 11 for mounting the head 12 and foot 13 of a hospital bed 14 thereon. In addition, the scale includes a single readout 15 such as a digital readout for receiving a signal from each platform 11 and for displaying a digital value corresponding to the received signals as a measure of weight of a load on the platforms 11.

Referring to FIGS. 2 and 3, each platform 11 has a support frame 16 which is of elongated skeletal box shape with a plurality of legs 17 (e.g. four) for supporting the frame 16 on a floor. Alternatively, the frame 16 may be supported on three legs with two at one end and one leg at the middle of the opposite end of the frame 16. This has been found to aid the accuracy of the scale when placed on a floor which is not level. The support frame 16 is formed by four beams 18 which define a rectangular opening and are supported at the corners on the legs 17. In addition, a cover 19 is hinged via hinges to one of the beams 18 so as to close over the opening. This cover 19 serves to protect the interior of the platform 11 against spills and the like and to permit ready inspection and maintenance of the interior workings of the platform 11. A handle 19' is also secured to the frame 16 for use in lifting the entire platform 11 for conveyance from place to place.

Each platform 11 also has a load frame 20 which is mounted on the support frame 16 for receiving the legs 21 of the bed 15 and for moving vertically relative to the support frame 16 upon receiving the bed 15. The load frame 20 includes a loading ramp 22 which extends longitudinally of and within the support frame 16. As shown, the ramp 22 is of generally channel-shaped construction of relatively wide width and has exposed ends which project from under the support frame 16 to receive the legs 21 of the bed 15. To this end, two of the three exposed edges of the ramp 22 at each end have an upstanding wall 23 (FIG. 2) while the remaining edge is unobstructed to permit rolling on of a wheel or roller 24 supporting the leg 21 of the bed 15. Further, each end section of the ramp 22 is provided with a raised bead or protuberence 25 to retain the wheel 24 thereon. In addition, a pair of U-shaped beams 26 are secured to the ramp 22 within the confines of the support frame 16, i.e. within the rectangular opening afforded by the beams 18 of the support frame. Each beam 26 is secured to the ramp 22, for example via bolts 27 (FIG. 4).

Each platform 11 also has a pair of displacement transmitting members 28 disposed at opposite ends of the support frame 11 to receive and transmit a load from the load frame 20. As indicated, each displacement transmitting member 28 is in the form of a box beam and has a pair of load flexures 29 secured thereon, for example by volts 30. Each flexure 29 is, in turn, secured to one end of a beam 26 via a suitable bracket 31 fixed, as by welding, within the beam 26. As indicated in FIG. 5, the flexures 29 are secured to the bracket 31 via bolts 32. In similar fashion, each displacement transmitting member 28 is secured via support flexures 33 to the support frame 16. The support flexures are secured via bolts 34 to the member and bolts 35 to the support frame 16 and permit the member 28 to pivot under an applied weight of a load on the load frame 20. As indicated in FIG. 5, the arrangement of the load flexures 29 and support flexures 33 on the transmitting members 28 is such as to permit the members 28 to pivot when the load frame 20 moves vertically.

Referring to FIGS. 4 and 6, a beam arm 36 is secured to each displacement transmitting member 28 so as to pivot therewith under an applied weight of a load on the load frame 20. As shown, the beam arm 36 is of elongated rectangular cross-section and extends away from the transmitting member 28 towards and in the plane of the opposite transmitting member 28.

A means in the form of a coil spring 37 is mounted on the support frame 16 and is secured to each beam arm 36 to proportionally restrain movement of the beam arm 36 relative to the support frame 16. To this end, the spring 37 is hooked about a bar 38 which is secured in a horizontal position on the support frame 16 as well as about a horizontally disposed pin 39 which is secured to a bracket 40 fixed to the free end of the beam arm 36 so as to restrain a downward motion of the beam arm 36. As shown, each bar 38 is provided with an annular recess or groove to receive an end of a spring 37.

Each platform 11 also has a pair of means such as linear variable differential transformers (LVDT) 40 mounted within the support frame 16 for emitting a signal corresponding to the displacement of the respective beam arms 36 relative to the support frame 16. As shown in FIGS. 5 and 6, each transformer 40 includes a coil 41 which is mounted on the support frame 16 via a plate 42 which is secured via a pair of bolts 43 to a similar plate 44 fixed to the support frame 16. In addition, each transformer has a core 45 which is mounted via an extension 46 on the bracket 40 on each beam arm 36. The core 45 is positioned relative to the coil 41 so as to travel therein in known manner. Each transformer 40 is electrically connected via a suitable electrical line 47 to the readout means 15 in order to emit a signal thereto corresponding to the movement of the core 45 within the coil 41 and, thus, to the displacement of the beam arm 36 relative to the support frame 16.

Figure 9:
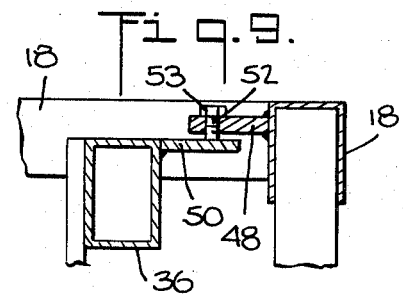
FIG. 9 illustrates a view taken on line 9—9 of FIG. 4.
Figure 7:
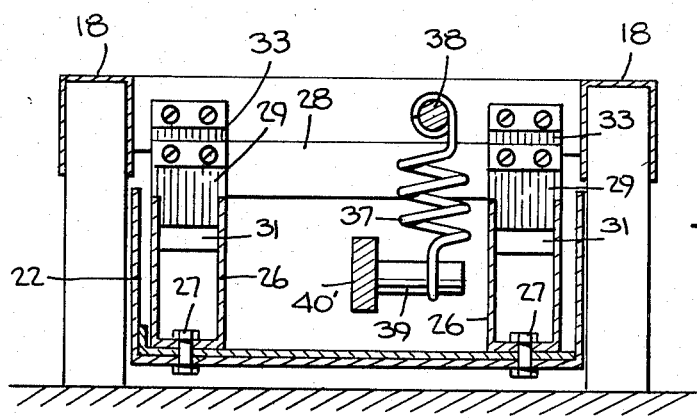
FIG. 7 illustrates a view taken on line 7—7 of FIG. 4.
Figure 8:
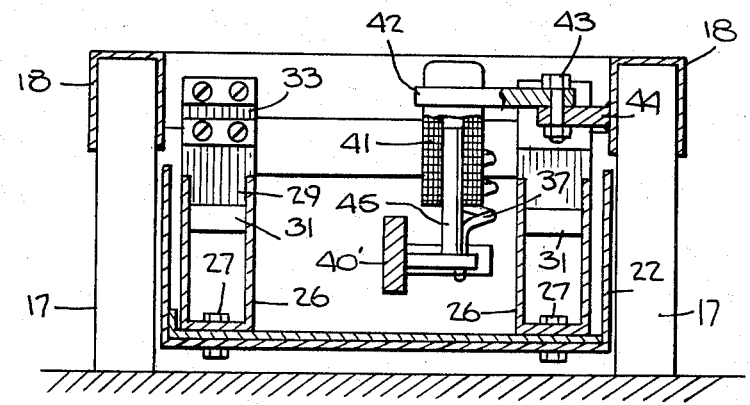
FIG. 8 illustrates a view taken on line 8—8 of FIG. 4.
Figure 6:
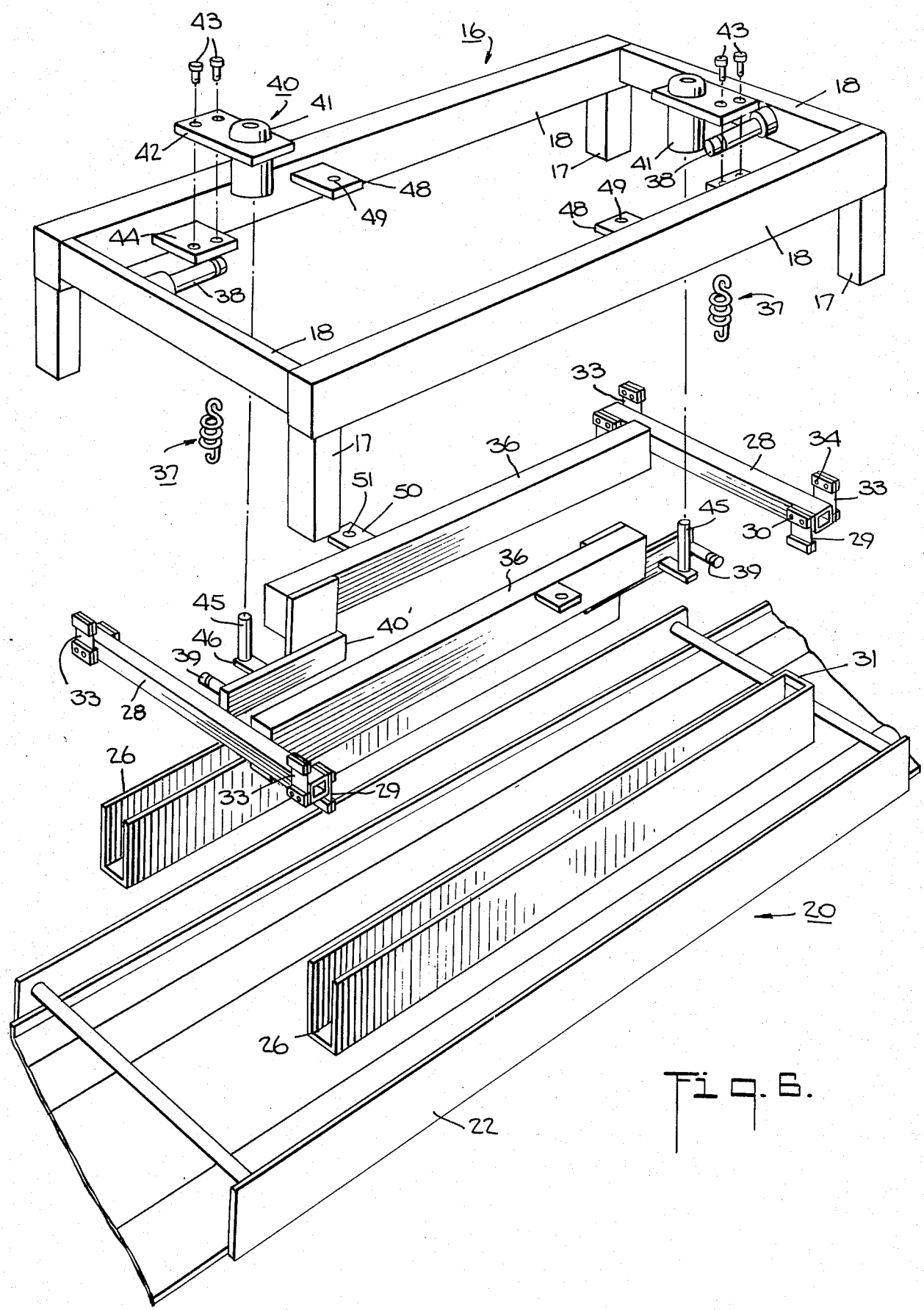

As shown in FIG. 3, the support frame 16 is also provided with a pair of brackets 48 each of which has a hole threaded 49 therein while each beam arm 36 carries a plate or bar 50 under a respective bracket 48. The threaded hole 49 in each bracket 48 receives an adjustable set screw 52 on which a nut 53 (FIG. 9) is threaded to secure the set screw 52 in place. When a minimum load, e.g. 150 pounds, is placed on the platform 11, the beams 36 pivot downwardly so that each bar 50 is spaced from and below a bracket 48. The springs 37 are then under tension and the beams 36 "float". When the minimum load, e.g. a bed is removed, the bars 50 will abut the set screws 52. This will prevent the springs 37 from fully relaxing and, thus, from jumping out of the bars 38 and will ensure proper seating of the springs 37 in the respective grooves. This is called the low limit set point. The upper load limit point is not adjustable but occurs when the beams 36 would otherwise abut the ramp 22.

The readout 15 is provided, for example with two identical printed circuit boards (not shown) each of which performs the same functions. For example, with each pair of transformers LVDT (LVDT) 40 being driven by a low voltage AC signal, for example a two volt p—p at 1600 Hz, the output of each transformer 40 is emitted to an amplifier within the readout. The output of each amplifier is then demodulated and the resultant DC signals are conditioned and summed. A balance circuit can be provided to assure that the gain of the two transformers (LVDT's) are equal. This assures that a weight placed on either side of the ramp 22 of a platform 11 will result in the same DC signal. Thereafter, the combined DC signal is multiplied and a trimming potentiometer is provided to assure that a test weight, for example 100 kilograms will result in a DC signal of 1.000 volts.

The sum of the two printed circuit boards represents the final value which is caused by a load applied on the two platforms 11 of the scale. The readout 15 may employ a simple digital volt meter to digitize the DC signal so that, for example, the 100 kilogram test weight results in a DC signal of 1.000 VDC, in turn, displaying 100.0 on the readout.

The readout 15 is not further described since such are well known in the art, for example as described in our previous U.S. Pat. No. 4,023,633.

In use, in order to weigh a bed ridden patient, the scale can be transported to the place where the bed 14 is stationed. At this time, each platform 11 is disposed at either end of the bed 14. Next, the legs 31 at the foot and head of the bed 14 are rolled onto the ramps 22 of the two platforms 11.

Next, the weight of the bed 14 is tared out via the trimming potentiometer of the readout 15, until a value of 0.00 appears on the volt meter. Next, the patient is placed in the bed 14 and the weight of the patient is read out directly on the readout 15.

If required, the under bed scale can be left in place and the weight of a patient can be monitored over an extended period of time.

It is to be noted that if the tare weight of a bed is known, there would be no need to remove a patient from the bed before placing the bed on the scale. In this case, however, the tare weight of the bed would be subtracted from the readout, for example by utilizing the trimming potentiometer.

The invention thus provides an under bed scale which does not interfere with normal operation of a hospital bed and which is rugged and does not require strain gauges.

Further, the under bed scale utilizes platforms 11 which are relatively compact and of minimal weight. For example, the platform size may be 8 inches by 37 inches by four inches whereas the weight may be 12 kilograms. The patient capacity of such an under bed scale can range between 0 and 150 kilograms and may be used with a maximum bed weight of 225 kilograms.

It has been found that the accuracy of the scale is 0.1% F.S. with sensitivities in the range of from 10 grams to 100 grams. In this regard, by having each beam arm 36 cooperate with an individual spring 37, the deflection of each spring 37 can be one-half the deflection of a spring in a scale as described in U.S. Pat. No. 4,023,633 for a given load range. This, in turn, means that the hysteresis in each spring 37 follows a flatter error curve; thus, leading to higher accuracies. Further, each beam arm 36 can be leveled or adjusted in the field independently of the others. This reduces the time required to set up the scale to a relative minimum. Further, the scale ramps 22 can accommodate wheel sizes of from 3 inches to 10 inch diameters so that the scales can be used with a wide range of beds in a hospital.

It is to be noted that each platform 11 can be used independently as a scale to obtain weights of various loads. As such, the ramp 22 can be used as shown or an alternative means can be used to apply the load to the load frame 20. In this case, the readout is connected to only the two LVDT's 40 to provide a readout indicative of the weight of a load on the load frame 20.

It is also to be noted that the scale can be built in various sizes so as to support different structures or objects. For example, the platform 11 could be made larger, and without ramp 22, to support a lounge chair, which are commonly used by patients undergoing treatment on the artificial kidney. The platform 11, could be made considerably larger, and be incorporated as part of the structure of a hospital bed. The support frame 16, could be mounted on casters, for ease of movement.

What is claimed is:

1. A scale comprising
   a support frame;
   a load frame to receive a load thereon;
   a pair of displacement transmitting members disposed at opposite ends of said support frame;
   a plurality of load flexures, each flexure connecting said load frame to a respective member to transfer the weight of a load on said load frame to said member;
   a plurality of support flexures connecting each member to said support frame to permit each member to pivot under an applied weight of a load on said load frame;
   a pair of beams arms, each arm being secured to a respective member to pivot about a horizontal axis in response to movement of said load frame;
   a pair of springs, each spring being mounted on said support frame and secured to each beam arm to proportionally restrain movement of each respective beam arm relative to said support frame; and
   a pair of means mounted on said support frame for emitting a signal corresponding to the displacement of a respective beam arm relative to said support frame.

2. A scale as set forth in claim 1 wherein said load frame has a loading ramp extending longitudinally of and within said support frame to receive a load thereon.

3. A scale as set forth in claim 2 wherein said load frame includes a pair of beams secured to said ramp, each beam being secured at each end to a respective load flexure.

4. A scale as set forth in claim 2 wherein each support frame is of elongated box shape and said loading ramp supported thereon in an elevated position.

5. A scale as set forth in claim 1 wherein each means is a linear variable differential transformer.

6. The combination of a pair of scales as set forth in claim 1 and a single readout for receiving a signal from each means and for displaying a value corresponding to a sum of the received signals as a measure of weight of a load on said load frame.

7. The combination of a pair of scales as set forth in claim 6 wherein said readout means is a digital readout means.

8. A scale comprising
   a pair of platforms for mounting of the head and the foot of a bed thereon; each said platform including a support frame, a load frame mounted on said support frame for receiving a bed and for moving vertically relative to said support frame upon receiving the bed, a pair of beam arms, each beam arm being connected to said load frame to pivot about a respective horizontal axis in response to movement of said load frame, a pair of springs, each said spring being mounted on said support frame and secured to each said beam arm to proportionally restrain movement of each said beam arm relative to said support frame, and a pair of means mounted on said support frame for emitting a respective signal corresponding to the displacement of a respective beam arm relative to said support frame; and a single digital readout for receiving a signal from each said means of each platform and for displaying a digital value corresponding to the received signals as a measure of weight of a load on said platforms.

9. A scale as set forth in claim 8 wherein each load frame includes a loading ramp extending longitudinally of and within said support frame to receive two legs of a bed thereon, and a pair of parallel beams fixed to said ramp within said support frame.

10. A scale as set forth in claim 9 which further comprises a pair of displacement transmitting members disposed on opposite ends of said support frame of each platform, a plurality of load flexures, each flexure connecting one end of a respective beam to a respective member to transfer the weight of a load on said load frame thereto and a plurality of support flexures connecting each said member to said respective support frame to permit each member to pivot under an applied weight of a load on said load frame.

11. A scale as set forth in claim 9 wherein each said ramp is disposed in an elevated position relative to said support frame.

12. A scale as set forth in claim 9 wherein each support frame is of elongated box-shape and has a plurality of legs for supporting said support frame on a floor with each said ramp in an elevated position relative to the floor.

13. A scale as set forth in claim 9 wherein each ramp has a raised bead at each end to retain a leg of a bed on said ramp.

* * * * *

UNITED STATES PATENT AND TRADEMARK OFFICE
CERTIFICATE OF CORRECTION

PATENT NO. : 4,281,730

DATED : August 4, 1981

INVENTOR(S) : BURT L. SWERSEY ET AL

It is certified that error appears in the above—identified patent and that said Letters Patent is hereby corrected as shown below:

Column IV, Line 32, after "the bracket" change "40" to --40'--

Column IV, Line 62, after "transformers" delete "LVDT"

Column IV, line 64, after "transformer" insert --LVDT--

Signed and Sealed this

Third Day of November 1981

[SEAL]

Attest:

GERALD J. MOSSINGHOFF

Attesting Officer    Commissioner of Patents and Trademarks